(12) United States Patent
Houston

(10) Patent No.: US 9,540,058 B1
(45) Date of Patent: Jan. 10, 2017

(54) SULKY APPARATUS

(71) Applicant: Steve R. Houston, Germantown, MD (US)

(72) Inventor: Steve R. Houston, Germantown, MD (US)

( * ) Notice: Subject to any disclaimer, the term of this patent is extended or adjusted under 35 U.S.C. 154(b) by 0 days.

(21) Appl. No.: 14/757,319

(22) Filed: Dec. 17, 2015

(51) Int. Cl.
*B62D 51/00* (2006.01)
*A01D 34/00* (2006.01)
*B62D 51/02* (2006.01)
*A01D 101/00* (2006.01)

(52) U.S. Cl.
CPC ............ *B62D 51/008* (2013.01); *A01D 34/00* (2013.01); *B62D 51/02* (2013.01); *A01D 2101/00* (2013.01)

(58) Field of Classification Search
CPC ............................. B62D 51/008; B62D 51/02
See application file for complete search history.

(56) References Cited

U.S. PATENT DOCUMENTS 5,810,371 A * 9/1998 Velke ................... B60D 1/143
280/32.7
6,637,760 B1 * 10/2003 Carman ............... A01D 34/001
280/32.7
8,448,957 B1 * 5/2013 Houston ................ B62D 51/02
280/204

* cited by examiner

*Primary Examiner* — Erez Gurari
(74) *Attorney, Agent, or Firm* — Michael W. York

(57) ABSTRACT

Sulky apparatus for use behind a self-propelled operator controlled machine such as lawn mowers that includes a sulky riding platform, a sulky boom having an inner end and an outer end for connecting the sulky riding platform to the self-propelled machine that is to tow the sulky riding platform, a pivotal connecting system for pivotally connecting the sulky riding platform to the outer end of the sulky boom and an adjusting system for adjusting the pivotal connecting system. The adjusting system for adjusting the pivotal connecting system is particularly useful in properly connecting the sulky apparatus to self-propelled machines that have different height frames. In another embodiment of the sulky apparatus invention for use behind a self-propelled machine that has operator control handles that includes a sulky riding platform, a sulky boom having an inner end and an outer end for connecting the sulky riding platform to the self-propelled machine that is to tow the sulky riding platform the invention includes a storage system for storing the sulky riding platform below the operator control handles of the self-propelled operator controlled machine. The storage system also includes an important brake system for preventing swinging or similar movement of the stored sulky riding platform.

8 Claims, 5 Drawing Sheets

SULKY APPARATUS

BACKGROUND OF THE INVENTION

Sulky apparatus for use with self-propelled machinery such as self-propelled lawn mowers have been in use for sometime and they allow the operator of self-propelled machinery to operate the machinery much more efficiently and allow much more to be accomplished with the machinery than was possible prior to such sulky apparatus. Typically, the sulky apparatus includes a platform for the operator to stand upon that has a single wheel that rides on the ground and some type of boom that was attached to the operator platform at one end and to the self-propelled machinery at the other end of the boom. Examples of such a sulky apparatus are set forth in U.S. Pat. No. 7,527,285 and in U.S. Pat. No. 8,448,957. In spite of the extensive use of such sulky apparatus, there are a number of problems that detract from the effective use of the present sulky apparatus. This sulky apparatus invention solves three of the present problems that are associated with current sulky apparatus and with their use.

The sulky usually has a riding platform that rides on the ground that an operator stands on and this is pivotally connected to a connecting boom that is in turn connected to the vehicle, such as a lawn mower, that is being driven by the operator. The pivotal connection between the riding platform and the boom usually uses a circular cross section cylinder that extends upward from the riding platform and a corresponding connecting portion on the outer end of the connecting boom that has a circular cross section hole that accepts and slides over the circular cross section cylinder that extends upward from the riding platform. This arrangement permits the riding platform to freely pivot about the outer end portion of the connecting boom. The proper operation of the sulky apparatus requires that the circular cross section cylinder or pivot pin that extends upward from the riding platform be substantially perpendicular to the adjacent ground. If this upward extending cylinder becomes tilted, this causes the riding sulky platform to not maintain a level riding surface while it is rotating during turns and maneuvers, which sulkies are constantly required to perform during their operation. This creates a rough irregular ride for the mower operator, and can also cause platform "shoveling" while the mower is driven backwards in reverse with the operator on foot off the sulky riding platform which is quite common. Shoveling is where, due to the upward extending cylinder becoming tilted, in the reverse mode, the reversing sulky platform edge actually attempts to dig into the adjacent ground or turf creating a very hazardous mower linear jack-knifing action which potentially can cause the mower, or other connected equipment, to flip over onto the operator causing operator injury.

Other operational problems, caused by the upward extending cylinder becoming tilted, is a constant platform grinding and scraping during turns due to constant riding platform wobbling. This, of course, is undesirable do to the damage to the customer's property as well as the physical damage this causes to the parts of the sulky itself.

Another problem with previous sulkies is that self-propelled mowers from different manufacturers have mower frames that have different heights and hence different height attachment points for the inner end of the sulky attachment boom. With the wide variety of commercial walk behind mowers types and the various different manufactures thereof, sulky mower frame mounting points can deviate by up to 12 inches in height as measured from the ground up to the mower frame's mounting area of a particular mower machine. This means that with a rigid or fixed sulky pivotal connection between the riding platform and the boom, most sulkies either are mounted and operated in poor working condition with a undesirable pivot pin tilt either aft or stern, or an attempt was made to correct this through the use of specially designed mounting brackets. Unfortunately for sulkies and their operators, generally sulkies are never properly matched to the correct mower deck height primarily because most sulkies are mass produced with just one particular pivotal connection between the riding platform and the boom. Whether or not the pivot pin is 90 degrees with the ground is strictly determined by the particular degree or angle the factory welded the pivoting axis structure to the end of the protruding boom arm and also the distance from the ground up to the sulky platform hitch mounting connection of the particular mower's rear frame. Consequently, pivot pin angles are rarely correct, at 90 degrees with the adjacent ground.

To help solve this industry wide problem, certain sulky manufacturers began providing various optional mounting hardware such as an inner end pivoting sulky attachment coupler height adjustment plates to use during the sulky attachment process. Unfortunately, however, most or all of these mounting kits and hardware either confused the purchaser and were not used at all, or were used but became cantilevering devices which began bending, deforming, and frequently actually broke the mower frames adjacent to where the adjustment plates were used.

The present invention allows the operator to manually attach the inner end portion of the sulky boom for different height frame attachment locations and then make the adjustments to insure that the circular cross section cylinder that extends upward from the riding platform, the pivot pin, is substantially perpendicular to the adjacent ground. With an adjustable pivot pin connection, discussed previously, the mounting height point becomes irrelevant because after the sulky hitch is attached to any particular mower frame at virtually any potential sulky hitch mounting height off the ground, the operator simply permanently adjusts the sulky riding platform's pivot pin to substantially 90 degrees to the ground below the pivot pin and the operator is done.

Another problem with previous sulkies is that that they do not provide proper compact onboard storage for the sulky riding platform that permits the operator to use the self-propelled mower or the like in the normal manner without using the sulky. This operator walking mode typically is desired to mow hills, embankments, drainage ditches, narrow turf areas and difficult tight spots or physically complicated mowing situations such as for example around a tree, near a fence, or abreast of a hill or fragile object such as a cable service box or telephone pole, etc. These examples and others can occur on any particular mowing job.

Currently, the sulky riding platform is stored on the mower when it is not in use by hanging it on a chain or strap or the like. Unfortunately, this allows the stored sulky platform to dangle in a free-swinging manner, usually just underneath the mower's handle bars, which also happens to be very close to the operator's own body. As a consequence, the operator, while attempting to operate their mower in a normal manner, is undesirably faced with a loose swinging and flailing sulky platform near the operator's body that can strike the operator and cause injury. With this invention, this problem is eliminated through the use of a brake system that prevents the stored sulky platform from swinging. Even though swing is prevented by this brake, it is very easy to release the brake and move the sulky platform into position for the operator to ride upon the sulky's riding platform.

SUMMARY OF THE INVENTION

This invention relates to sulky apparatus and more particularly to improved sulky apparatus that allows the operator of the sulky apparatus to adjust the sulky apparatus so that it operates properly.

It is an object of the present invention to provide sulky apparatus that allows the operator of the sulky apparatus to properly adjust the connection between the sulky riding platform and the sulky riding platform connecting boom so that the sulky riding platform operates properly.

It is an object of the present invention to provide sulky apparatus that allows the operator of the sulky apparatus to properly adjust the connection between the sulky riding platform and the sulky riding platform connecting boom so that the sulky riding platform operates safely.

It is an object of the present invention to provide sulky apparatus that allows the operator of the sulky apparatus to properly adjust the connection between the sulky riding platform and the sulky riding platform connecting boom so that the sulky riding platform operates smoothly.

It is an object of the present invention to provide sulky apparatus that allows the operator of the sulky apparatus to easily adjust the pivotal connection between the sulky riding platform and the sulky riding platform connecting boom.

It is an object of the present invention to provide sulky apparatus that allows the operator of the sulky apparatus to properly adjust the pivotal connection between the sulky riding platform and the sulky riding platform connecting boom with a minimum of tools.

It is an object of the present invention to provide sulky apparatus that allows the operator of the sulky apparatus to store the sulky riding platform.

It is an object of the present invention to provide sulky apparatus that allows the operator of the sulky apparatus to store the sulky riding platform out of the way of the operator that is using the attached lawn mower.

It is an object of the present invention to provide sulky apparatus that allows the operator of the sulky apparatus to secure the sulky riding platform in the stored position.

It is an object of the present invention to provide sulky apparatus that allows the operator of the sulky apparatus to prevent the stored sulky riding platform from moving.

It is an object of the present invention to provide sulky apparatus that allows the operator of the sulky apparatus to prevent the stored sulky riding platform from swinging when the sulky riding platform is in the stored position.

It is an object of the present invention to provide sulky apparatus that allows the operator of the sulky apparatus to readily remove the sulky riding platform from the stored position.

It is an object of the present invention to provide sulky apparatus that allows the operator of the sulky apparatus to connect the sulky apparatus to different types of lawn mowers.

It is an object of the present invention to provide sulky apparatus that allows the operator of the sulky apparatus to connect the sulky apparatus to lawn mowers having different height frames and adjust the connection between the sulky riding platform and the sulky riding platform connecting boom so that the sulky riding platform operates properly.

These and other objects of the invention will be apparent from the following described sulky apparatus invention for use behind a self-propelled machine that includes a sulky riding platform with a single wheel rim and tire for allowing the operator riding platform to move along the ground, a sulky boom having an inner end and an outer end for connecting the sulky riding platform to the self-propelled machine that is to tow the sulky riding platform, pivotal connecting means for pivotally connecting the sulky riding platform to the outer end of the sulky boom and sulky pivotal connection adjusting means for adjusting the pivotal connecting means. The invention also includes storage means for storing the sulky apparatus below the operator control handles of the self-propelled operator controlled machine and out of the way of the operator of the self-propelled operator controlled machine including braking means for preventing stored riding platform swinging.

BRIEF DESCRIPTION OF THE DRAWINGS

The invention will be hereinafter more completely described with reference to the accompanying drawings in which.

DETAILED DESCRIPTION OF THE PREFERRED EMBODIMENTS

Figure 1:
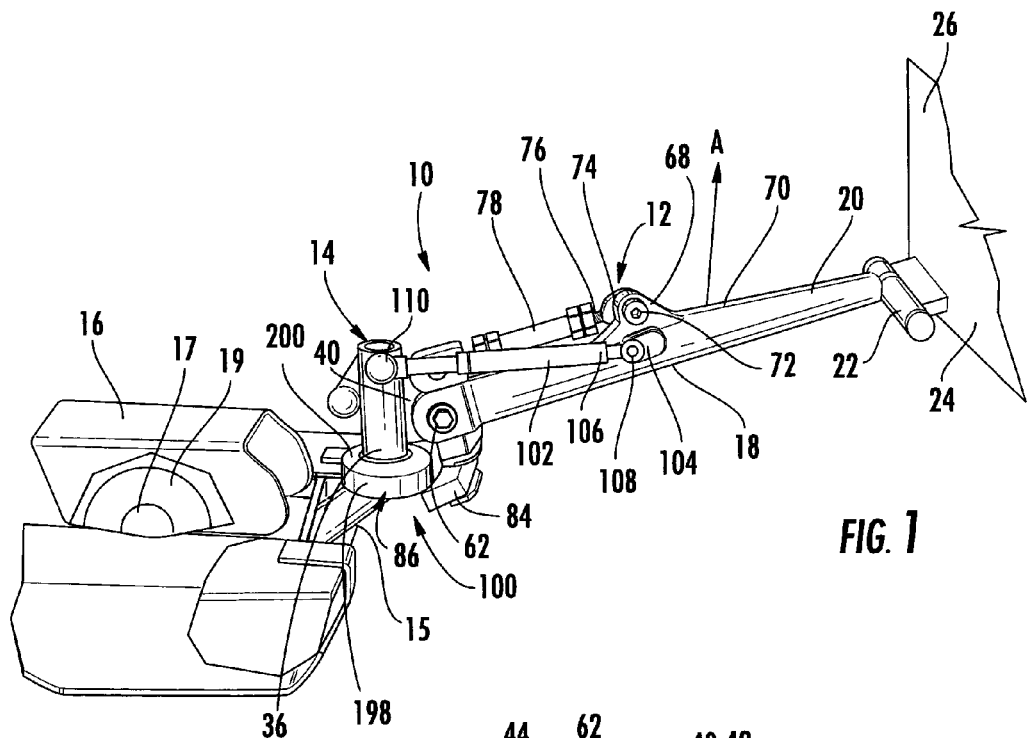
FIG. 1 is a right side perspective view of the sulky apparatus invention showing the sulky apparatus in the in use position with a portion thereof broken away.

Referring first to FIG. 1, the sulky apparatus invention is illustrated and is designated generally by the number 10. As illustrated, the sulky apparatus invention 10 includes an elongated boom assembly 12 that is connected to a pivot assembly 14 that is connected to the forward end portion 15 of a sulky riding platform 16. The pivot assembly 14 comprises means for connecting the boom assembly 12 to the sulky riding platform 16. The sulky riding platform 16 and the associated wheel rim 17 and tire 19 are conventional and are not novel and hence will not be described in any detail. The boom assembly 12 comprises an elongated boom member 18 that is connected at its forward end 20 by a conventional pivotal connector 22 to the frame 24 of a conventional self-propelled lawn mower 26 or the like. The pivotal connector 22 allows the boom member 18 to be manually pivoted upward as illustrated by the arrow A in FIG. 1.

Figure 2:
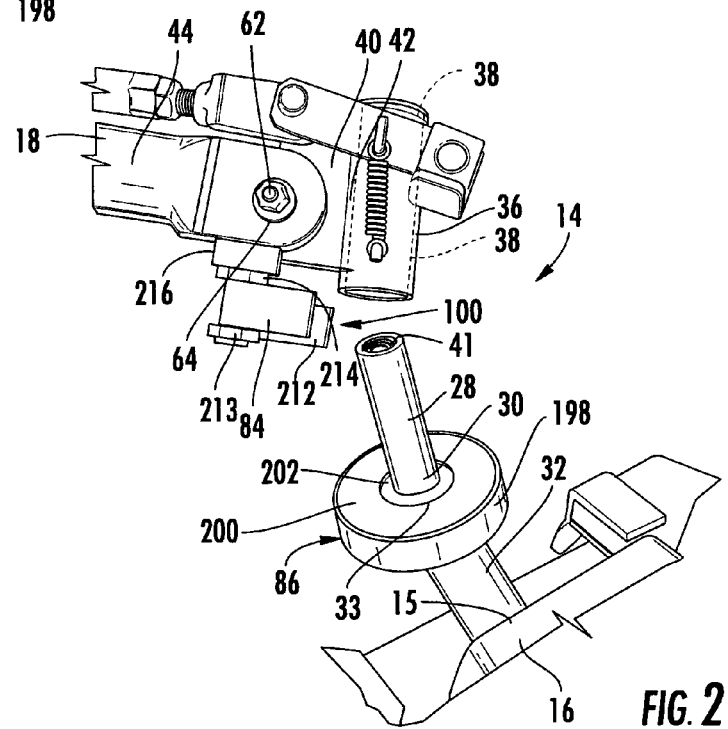
FIG. 2 is an enlarged perspective view of certain parts of the sulky apparatus invention illustrated in FIG. 1 disassembled, illustrating the details of the connection of the outer end of the sulky boom to the sulky riding platform.
Figure 3:
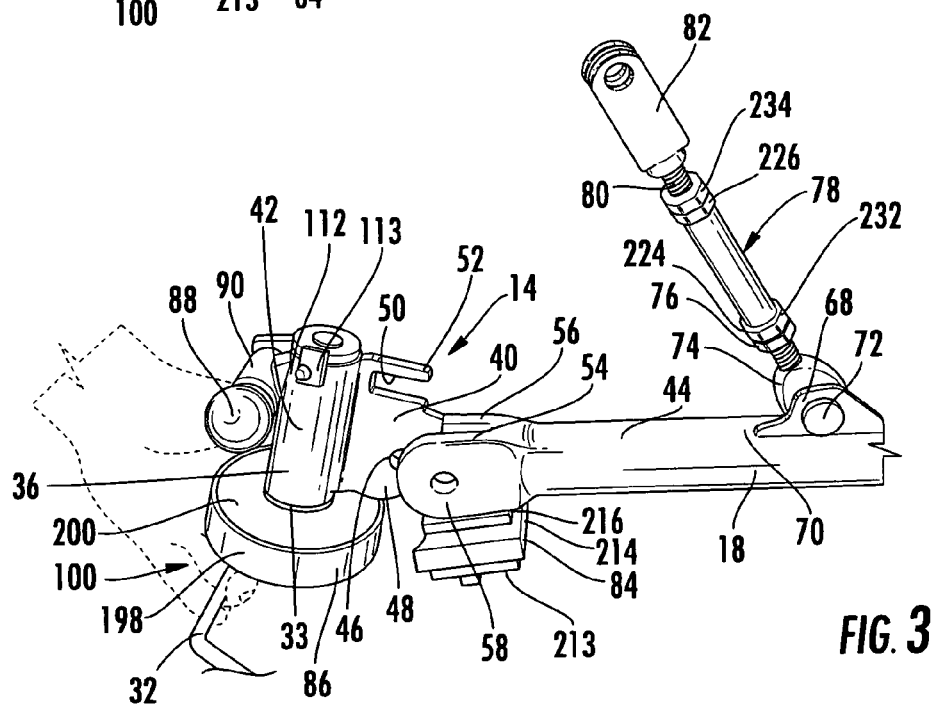
FIG. 3 is an enlarged perspective view of certain parts of the sulky apparatus invention set forth in FIG. 1 showing certain parts of the sulky apparatus invention disassembled illustrating additional details of the connection of the outer end of the sulky boom to the sulky riding platform.

The details of the pivot assembly 14 are illustrated in the disassembled views set forth in FIGS. 2 and 3. As illustrated in FIGS. 2 and 3, the pivot assembly 14 includes an upward projecting solid cylindrical straight pin member 28 whose lower end portion 30 passes through and is connected by welding or the like to a flange member 33 that surrounds the exterior of the pin member 28. The lower end portion 30, below the flange member 33, is also connected to a generally cylindrical cross section member 32 in a manner that will hereinafter described in detail. The member 32 is in turn connected by welding or the like to the forward end portion 15 of the sulky riding platform 16.

Figure 4:
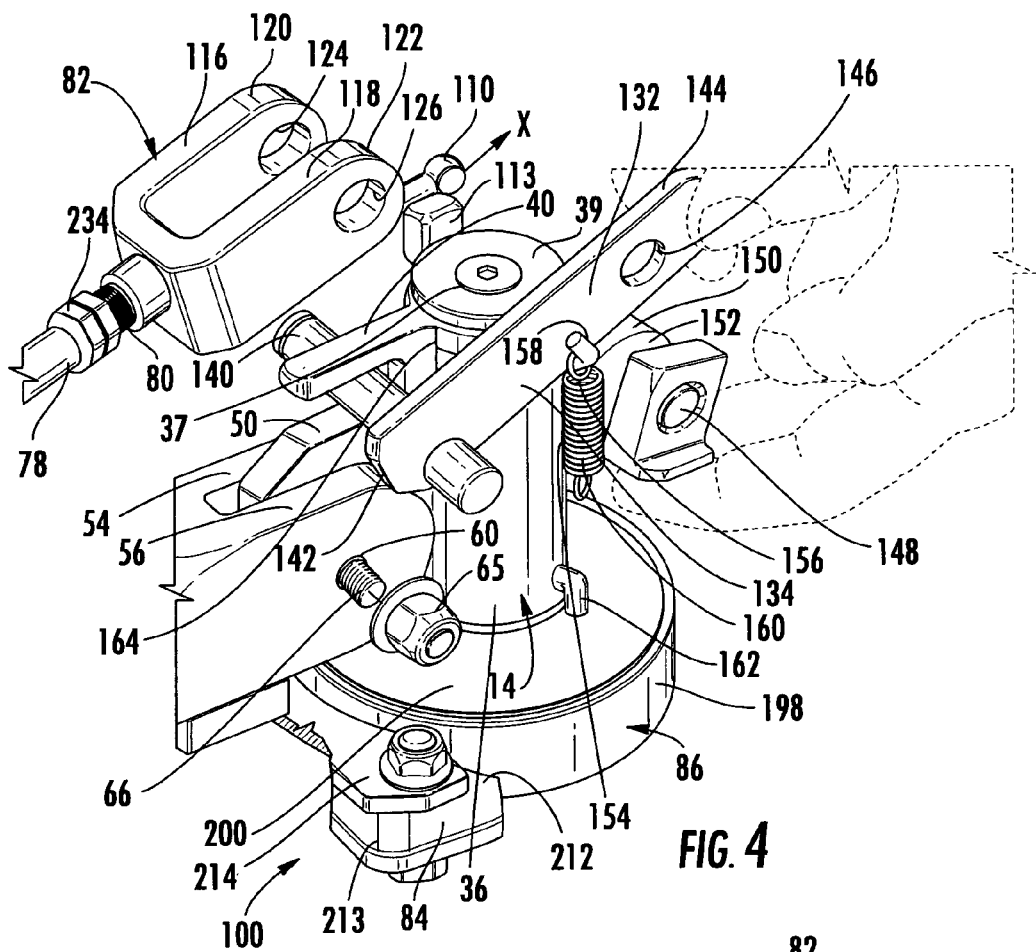
FIG. 4 is an enlarged perspective view of certain parts of the sulky apparatus invention set forth in FIG. 2 showing certain parts of the sulky apparatus invention further disassembled illustrating additional details related to the connection of the outer end of the sulky boom to the sulky riding platform.
Figure 5:
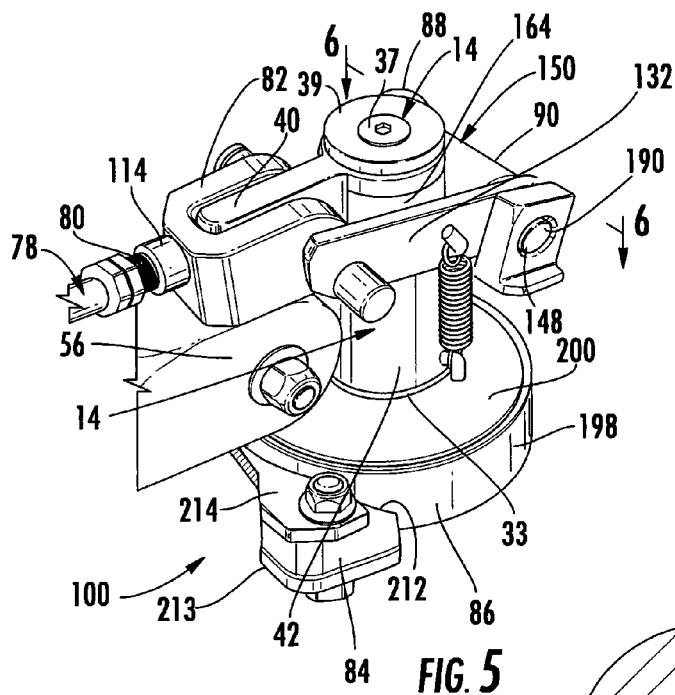
FIG. 5 is a perspective view of certain parts of the sulky apparatus invention set forth in FIG. 4 showing certain parts of the sulky apparatus invention in their assembled condition.

As illustrated in FIGS. 2 and 3, a generally cylindrically shaped elongated pin housing 36 has an elongated circular cross section hole 38 extending lengthwise through it that is sized and shaped to receive the solid cylindrical straight pin member 28. The tolerances between the outside of the pin member 28 and adjacent walls of the hole 38 in the pin housing 36 are sufficient to allow the pin member 28 to freely rotate within the hole 38 in the elongated pin housing 36. As best illustrated in FIGS. 2, 4, and 5, the pin housing 36 is rotatably secured to the top of the pin member 28 by a fastener 37 and the adjacent associated washer 39. In the preferred embodiment, the fastener is a flat head socket head cap screw size 5/16"-18×7/8". This screw is available from the McMaster Carr Company of ElmHurst, Ill. The washer 39 is made from solid steel cylindrical bar stock with a diameter equal to that of the pin housing 36 and a ¼" thick piece is cut off. A 0.320 center hole is then drilled through this ¼" piece and a 82 degree countersink tool is then used to machine out a matching conical surface to match the underside surface of the flat head socket head cap screw fastener 37. This fastener 37 screws into a threaded hole 41 on the top of the pin member 28 as illustrated in FIG. 2 and the washer 39 retains the pin housing 36 on the pin member 28. It is important to note that after the screw fastener 37 is tightened, there should be a slight gap between the underside of the washer 39 and the adjacent top of the pin housing 36. This gap prevents binding and allows rotation between the pin housing 36 and the pin member 28. In addition, the pin housing 36 is slightly shorter than the pin member 28 and this allows the pin housing 36 to freely rotate about the pin member 28. The lower end of the pin housing 36 also contacts the upper flat surface of the flange member 33 and is free to rotate on this flat surface as best illustrated in FIGS. 3, 4. and 5.

As illustrated in FIGS. 2, 3, 4, and 5, the pin housing 36 has a thin generally rectangular shaped connecting plate 40 projecting from its outer surface 42 toward the outer end portion 44 of the elongated boom member 18. The connecting plate 40 is welded to the outer surface 42 of the pin housing 36.

As illustrated in FIG. 3, the connecting plate 40 has a circular hole 46 extending through its lower portion 48 and an elongated slot 50 located in its upper portion 52 and the connecting plate 40 slides between two flat substantially identical spaced apart projections 54 and 56 that have substantially identical circular holes 58 and 60 (FIGS. 3 and 4) in them that are the same size as the hole 46 in the connecting plate 40. A circular cylindrical pivot fastener 62 is passed through the holes 58 and 60 and secured in place in the holes 58 and 60 by a hex-head nut and washer 64 as illustrated in FIG. 2. It will be noted in FIG. 4, that a nut 65 has been removed from the threaded portion 66 of the cylindrical pivot fastener 62 in order to illustrate the hole 60. This arrangement allows the pivot assembly 14 to pivot about the fastener 62 up and down at the outer end portion 44 of the elongated boom member 18.

As illustrated in FIGS. 1, 3 and 4, the elongated boom member 18 has a conventional commercial turnbuckle assembly 78 attached to it. In this connection, a fastening projection 68 is welded to the top portion 70 of the boom member 18 and a shoulder bolt fastening member 72 extends through the fastening projection 68 and into a flat pivoting connecting member 74 that has a left-handed threaded portion that threads onto the inner left-handed end 76 of turnbuckle 78. The other right-handed threaded end 80 of the turnbuckle 78 has a generally rectangular shaped fastening member 82 threaded on it. The turnbuckle 78 and associated structure comprise means for adjusting the previously mentioned means for connecting the boom assembly 12 to the operator riding platform 16 as will hereinafter be described in detail. The fastening member 82 and how it functions will also be hereinafter described in detail. FIGS. 1, 2 and 3 also illustrate a brake pad 84, a brake drum 86, a handle and plunger 88 and a plunger cylinder 90 that form part of a brake system 100 that will hereinafter be described in detail.

As best illustrated in FIGS. 1, 8, 9, 10 and 12 the elongated boom member 18 has a pneumatic power cylinder 102 attached to it. In this connection, as indicated in FIG. 1, a fastening projection 104 is welded to the top portion 70 of the boom member 18 adjacent to the previously described fastening projection 68. The inner end 106 of the pneumatic power cylinder 102 is a screw-on eyelet that is part of the pneumatic cylinder 102 and is connected to the fastening projection 104 by a shoulder bolt 108 that extends through the fastening projection 104 and the screw-on eyelet that is part of the pneumatic cylinder 102 and the outer end 110 of the pneumatic power cylinder 102 snaps on to an associated fastener 112 (see FIG. 3) that is welded to the top outer portion of a rectangular shaped mounting block 113 that is in turn welded to the pin housing 36. It will be noted that the outer end 110 of the pneumatic cylinder that snaps on the associated fastener 112 is not illustrated in FIG. 3 in order to illustrate the fastener 112.

The pneumatic power cylinder 102 is a conventional commercial item, Gas Spring #9416K14, for one hundred and thirty pounds that is available from McMaster Carr Company of Robbinsville, N.J.

FIGS. 4 and 5 illustrate how the fastening member 82 is connected to the pivot assembly 14 and how it is assembled and interacts with associated components. As best illustrated in FIG. 5, the fastening member 82 has an inner threaded end portion 114 that is threaded and welded on the mating threads of the threaded end 80 of the turnbuckle 78. As best illustrated in FIG. 4, two substantially identical spaced apart projecting portions 116 and 118 are located on the other end of the fastening member 82. These projecting portions 116 and 118 have respective substantially identical rounded ends 120 and 122 and respective substantially identical circular holes 124 and 126 that extend through the rounded ends 120 and 122 of the projecting portions 116 and 118.

As illustrated in FIGS. 4 and 5 a linkage member 132 is designed to be connected to the fastening member 82 and this linkage member 132 has a thin rectangular shaped body 134 with a rounded end portion 144 (FIG. 4). A circular cross section pin 140 projects outward from the inner side of the body 134 near its inner end 142 and this pin 140 is sized and shaped to slide into the respective substantially identical circular holes 124 and 126 that extend through the outer portions 120 and 122 of the projecting portions 116 and 118. As illustrated in FIG. 4, the pin 140 is also sized and shaped to fit into the elongated slot 50 in the connecting plate 40. The outer end 144 of the body 134 has a circular hole 146 located in it that is sized, shaped and located to allow the outer cylindrical end portion 148 of a locking pin assembly 150 to pass through it. In this connection, in normal use, the outer end 144 of the body 134 that has the circular hole 146 located in it, is located in a slot 152 in the locking pin assembly 150 and is held in this position in the slot 152 by a small coil spring 154 whose upper end 156 is connected to a small hook 158 connected to the outer side of the body 134 and whose lower end 160 is connected to a hook 162 on the outside of the pin housing 36. The outer end 110 of the pneumatic power cylinder 102 and its associated snap fastener block 113 are also illustrated in FIG. 4 and, as illustrated by the arrow labeled X, the outer end 110 of the pneumatic power cylinder and its associated snap fastener block 113 result in an outward force being exerted in the X direction on the pin housing 36.

Figure 6:
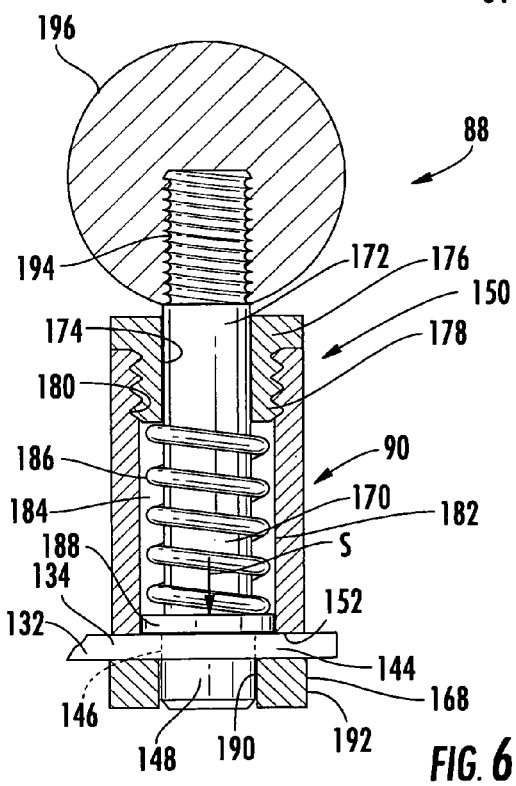
FIG. 6 is an enlarged partial sectional view of a connecting pin and associated structure taken on the plane indicated by the line 6-6 in FIG. 5 showing the interior parts of a connecting pin assembly of the sulky apparatus invention showing the connecting pin assembly in the connected position.

FIG. 5 illustrates the structure set forth in FIG. 4 in its assembled configuration and, as illustrated, the linkage member 132 serves the important function of connecting the upper portion 164 of the pivot assembly 14 to the fastening member 82 that has the inner threaded end portion 114 that is threaded on the mating threads of the threaded end 80 of the turnbuckle 78. FIG. 6 illustrates a partial sectional view of the locking pin assembly 150 taken on the plane illustrated by the line 6-6 in FIG. 5. As illustrated in FIGS. 5 and 6, in order to accomplish the connection to the upper portion 164 of the pivot assembly 14, a cylindrical end portion 148 extends through the hole 146 in the body 134 (FIG. 4) and through a circular cross section hole 190 in the outer end portion 168 of the locking pin assembly 150. The hole 190 is sized and shaped to receive the cylindrical end portion 148. It will be noted, that if the cylindrical end portion 148 does not extend through the hole 146 in the body 134 (FIG. 4) and through the circular cross section hole 190 in the outer end portion 168 of the locking pin assembly 150, then there is no connection between the upper portion 164 of the pivot assembly 14 and the fastening member 82. Consequently, it is very important that the cylindrical end portion 148 extend through the hole 146 in the body 134 (FIG. 4) and through the circular cross section hole 190 in the outer end portion 168 of the locking pin assembly 150, and that the outer end portion 148 is held in this position by spring force that is provided by the locking pin assembly 150 as will be hereinafter described in detail.

FIG. 6 illustrates how the spring force is applied to retain the outer end portion 148 in the position illustrated in FIG. 5. FIG. 6 illustrates the previously mentioned handle and plunger 88 and the plunger cylinder 90. The handle and plunger 88 includes an elongated circular cross section uniform diameter shaft 170 whose outer portion 172 slides within a circular cross section hole 174 in a threaded bolt 176 whose lower threaded portion 178 is sized and shaped to be threaded into the threaded aperture 180 in a generally cylindrical shaped spring housing 182. The spring housing 182 has a centrally located enlarged circular cross section bore 184 that contains a coil spring 186 that exerts a spring force indicated by the arrow S against an adjacently located collar 188 that is located around and is permanently attached to the shaft 170. The end portion 148 of the shaft 170, the portion of the shaft 170 beyond the collar 188, extends into a centrally located circular cross section hole 190 that extends completely through a generally rectangular shaped locking block 192 that is secured to the adjacent end of the spring housing 182 by conventional means such as by welding or the like, As illustrated, the threaded upper end portion 194 of the shaft 170 is threaded into in a round plastic ball 196. In assembling the locking pin assembly 150, the shaft 170 and the attached collar member 188, the coil spring 186 will be appropriately inserted into the bore 182 in the spring housing 184 and then the hole in the threaded bolt 176 will be slipped over the outer end of the shaft 170 and the threaded bolt 176 will be secured in the threaded portion in the upper end of the spring housing 182. The ball 196 will be added and secured in place last by screwing it on the threaded end portion 194 of the shaft 170. The ball 196 serves as a convenient handle as will hereinafter be described in detail. In order to gain access to the shaft 170 and the coil spring 186 for repair or replacement, the threaded bolt 176 is removed from the spring housing 182. The ball 196 is then unscrewed from the threaded end 194 of the shaft 170 and then the coil spring 186 and shaft 170 can be repaired or replaced.

In FIG. 6, it will be noted that the outer end portion 168 of the locking pin assembly 150 has the locking block 192 and that the locking block 192 has the slot 152 that is sized and located to receive the outer end 144 of the linkage member 132 and its hole 146 in the slot 152. It will also be noted, that the end portion 148 extends through the hole 190 in the locking block 192. Since the coil spring 186 exerts a spring force indicated by the arrow S against the adjacently located collar 188 that is located around and is permanently attached to the shaft 170, this causes the end portion 148 to remain in the hole 146 in the outer end portion 144 the body 134 and secure the linkage member 132 in the slot 152 in the locking block 192 and in the hole 190 in the locking block 192 until the ball handle 196 is manually pulled outward. The spring housing 182 and the attached locking block 192 are permanently secured to the outside of the pin housing 36 by welding or the like so that the long axis of the spring housing 182 and the attached locking block 192 is substantially perpendicular to the long axis of the pin housing 36 as illustrated in FIGS. 3, 4 and 5.

Figure 7:
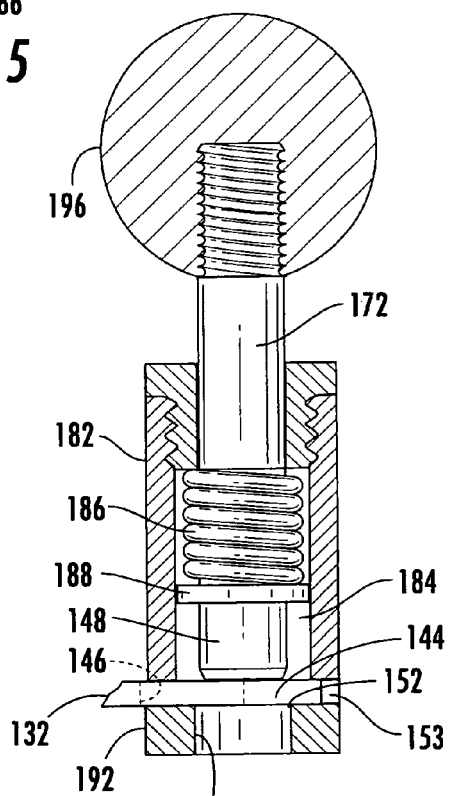
FIG. 7 is a view of the structure set forth in FIG. 6 showing the connecting pin assembly in the unconnected position.

FIG. 7 illustrates the structure set forth in FIG. 6 when the ball 196 is pulled outward. In FIG. 7, it will be noted that the end portion 148 has been retracted so that it is no longer located in the locking block 192. This occurs because, as illustrated in FIG. 7, with the ball 196 in the outward position, the shaft 170 and the attached collar 188 have been moved outward resulting in compression of the coil spring 186 and movement of the end portion 148 out of the hole 146 in the outer end portion 144 the linkage member 132 and into the bore 184 in the spring housing 182. Since the end portion 148 is no longer located in the hole 146 in the outer portion 144 of the linkage member 132, the linkage member 132 can be moved in the slot 152 in the locking block 192 and in FIG. 7 the linkage member 132, with its hole 146, is shown moved in the slot 152. This movement in the slot 152 is made possible in view of the previously mentioned slot 50 in the connecting plate 40 that allows the pin 140 to move in the slot and hence the linkage member 132 that is connected to the pin 140 to also move in the slot 152. It will be noted in FIG. 7, that the slot 152 has a bottom wall 153 that is located at a depth that results in the linkage member 132 being located at a depth in the slot 152 so that its hole 146 is located at a depth in the slot 152 so that the end portion 148 can enter the hole 146 when the pin assembly is in the locked configuration illustrated in FIG. 6.

As previously indicated, FIGS. 1, 2, 3, 4 and 5 illustrate a brake system 100 that includes a brake pad 84, a brake drum 86, a handle and plunger 88 and a plunger cylinder 90. As illustrated in FIG. 2, the brake drum 86 comprises a circular narrow cylindrical brake surface 198 that is secured to the upper surface 200 of the of the brake drum 86 by welding or the like. The upper surface 200 has a circular cross section hole 202 in its center that is sized slightly larger than the pivot pin 28 shaft and hence the hole 202 allows the disc 200 and the entire brake drum 86 to be slipped over and around the fixed pivot pin 28 shaft. As illustrated in FIG. 2 the edges of the hole 202 are secured to the outside upper surface of the flange member 33 by welding from underneath the disc 200. As previously mentioned, another essential component of the brake system 100 is the brake pad 84. As best illustrated in FIGS. 2, 4, and 5, the brake pad 84 has an outer curved surface 212 that is curved to match the curved cylindrical brake surface 198. The brake pad 84 is secured in place by a clamping member 213 that clamps the brake pad 84 in position so that its curved surface 212 is pressed against the narrow cylindrical brake surface 198 when the brake system 100 is activated as will be hereinafter described in detail. The upper portion 214 of the brake clamping member 213 is secured by a connecting block 216 to the lower outer under portion of boom assembly 12 by welding or the like. The pneumatic power cylinder 102 illustrated in FIGS. 1, 8, 9, 10 and 12 also has a function in the brake system 100. The purpose of the brake system 100 is to prevent the sulky riding platform 16 from swinging when the sulky riding platform 16 is in its stored position in a manner that will be hereinafter described in detail.

The use and functioning of the sulky apparatus invention 10 will now be described in detail. As indicated previously, the proper operation of a sulky requires that the circular cross section cylinder or pivot pin 28 that extends upward from the sulky riding platform 16 be substantially perpendicular to the adjacent ground. With this sulky apparatus invention 10, this is easy to accomplish using the turnbuckle 78 that is connected between the fastening projection 68 and the pin housing 36 through the previously described fastening member 82, the linkage member 132 that in turn is connected to the end portion 148 of the handle and plunger 88 and a plunger cylinder 90 that is in turn welded to the outside of the pin housing 36 as illustrated in FIGS. 1, 4 and 5. As mentioned above, since the turnbuckle 78 is connected to a fastening projection 68 that is welded to the top portion 70 of the boom member 18 at one end and effectively connected to the outside of the pin housing 36 on the other end and as indicated previously the pin housing 36 pivots about the pivot fastener 62, any change in the length of the turnbuckle 78 will cause corresponding rotation of the pin housing 36 and the cylindrical straight pin member 28 located in the pin housing 36 about the pivot fastener 62. As a result of this, the turnbuckle 78 can be used to achieve the desired ninety degree relationship of the straight pin member 28 with the adjacent ground G (FIG. 8).

Figure 8:
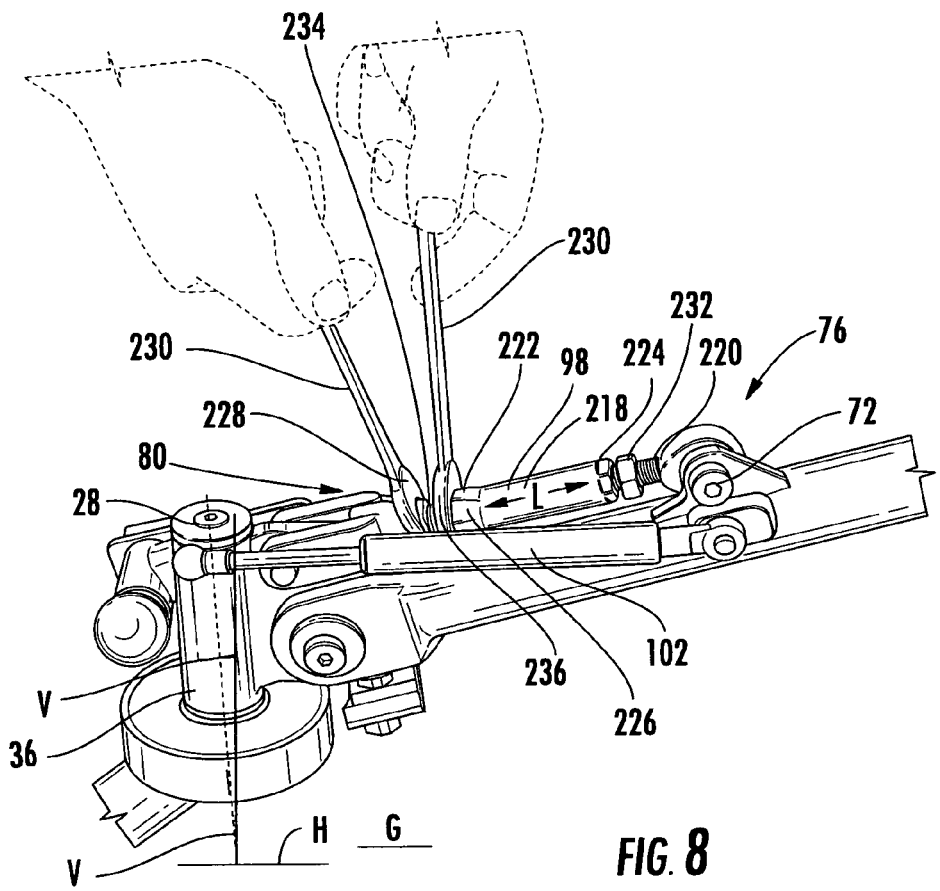
FIG. 8 is a right side perspective view of the sulky apparatus invention illustrating the adjustment of a turnbuckle system that forms part of the sulky apparatus invention.

FIG. 8 illustrates the use of the turnbuckle 78 to adjust the orientation of the pin member 28. As illustrated, the turnbuckle 78 has a central housing 218 that has threaded end portions 220 and 222 that are threaded on the respective inner and outer ends 76 and 80 of the turnbuckle 78. The threaded end portions 220 and 222 each have an exterior surface with identical hexagonal shaped flat surfaces 224 and 226 that accept the end 228 of a open end wrench 230 or the like as illustrated for the threaded portion 222. It will also be noted that two hexagonal lock nuts 232 and 234 are threaded on the respective inner and outer ends 76 and 80 of the turnbuckle 78 and it will be noted that the end portion 236 of another identical open end wrench 230 is located on the hexagonal surface 226.

As illustrated in FIG. 8, the ideal orientation for the pin member 28 is illustrated by the vertical line V and the intersecting horizontal line H where the line V forms a ninety degree angle with the line H. It will be noted that the pin member 28 in FIG. 8 is not oriented in a proper ninety degree angular relationship with the ground G below the pin member 28. Consequently, proper adjustment of the turnbuckle 78 is required. In order to accomplish this adjustment, the two hexagonal lock nuts 232 and 234 would be loosened using an open end wrench 230. The housing 218 would then be rotated using an open end wrench 230 to either shorten or lengthen the length L of the turnbuckle 78. In the situation illustrated in FIG. 8, the length L would be decreased to bring the pin member 28 into a perpendicular relationship with the adjacent terrain or ground plain G. After this had been accomplished, the two hexagonal lock nuts 232 and 234 would be tightened using the open end wrench 230 so that the length L of the turnbuckle 78 would not change when the sulky apparatus 10 is in use.

Figure 9:
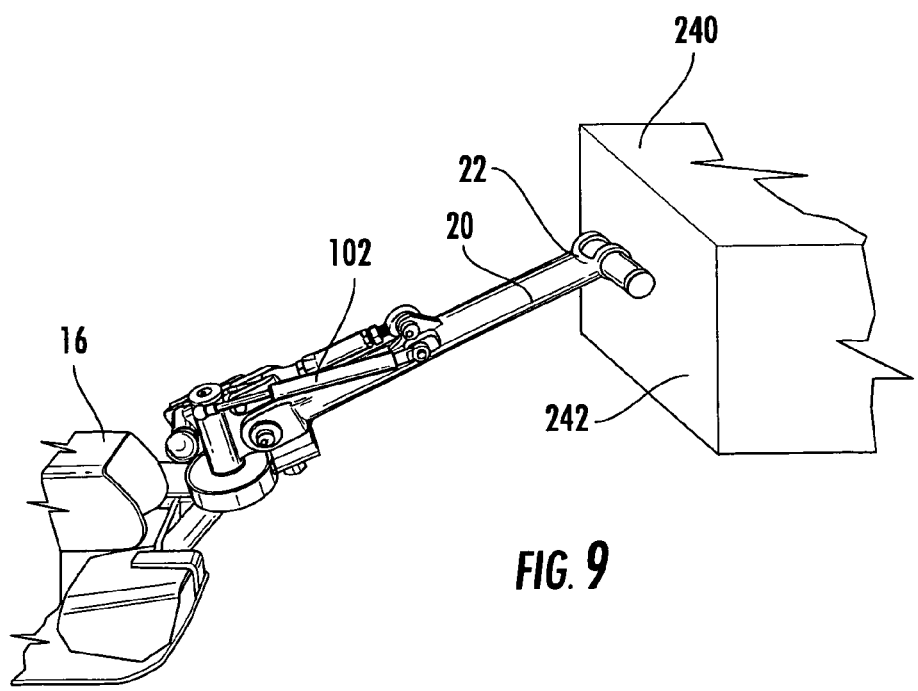
FIG. 9 is a right side perspective view of the sulky apparatus invention illustrating the adjustment of a turnbuckle system for using the sulky apparatus invention behind self-propelled lawn mowers having different height frames.

The primary purpose of the previously described turnbuckle 78 system is to allow the sulky riding platform 16 and its associated boom assembly 12 with its boom member 18 to be connected to different self-propelled lawn mowers or the like that have different height frames. FIG. 9 illustrates the sulky apparatus invention 10 in use with a different self-propelled lawn mower 240 or the like that has a higher height frame 242 than the previous frame 24 for the self-propelled lawn mower 26. In order to use the sulky apparatus 10 with the higher height frame 242 mower 240, the operator manually raises the inner end of the boom 20 and connects the conventional connector 22 in a conventional manner to the high frame 242 of the new lawn mower 240. Then, the operator adjusts the angle of the pivot pin 28 with the adjacent ground G in the manner set forth previously with respect to FIG. 8.

Figure 10:
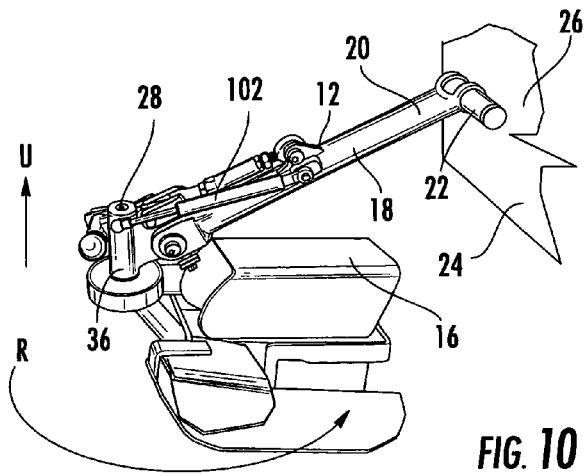
FIG. 10 is a right side perspective view of the sulky apparatus invention showing the sulky riding platform in the folded position in preparation for being moved to the storage position.
Figure 11:
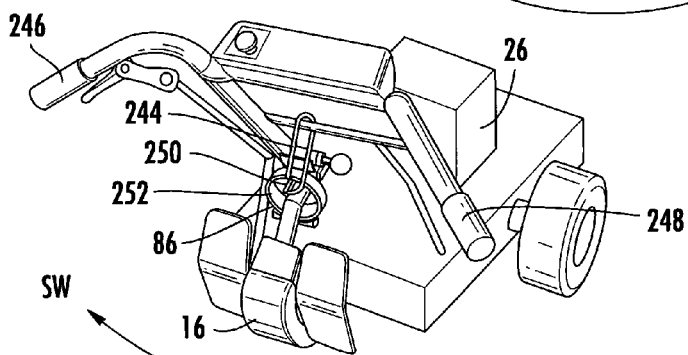
FIG. 11 is a perspective view of the sulky apparatus invention showing the sulky riding platform in the storage position between the handles of a self-propelled lawn mower.
Figure 12:
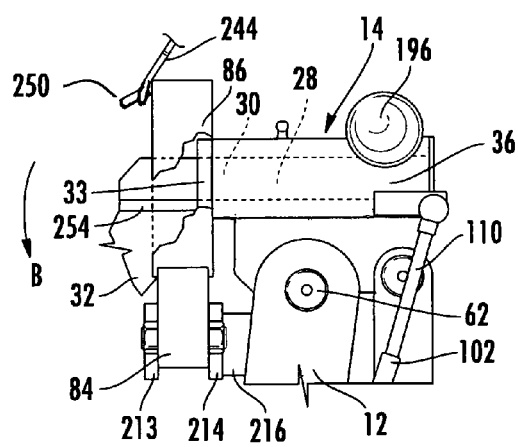
FIG. 12 is an enlarged perspective view of a portion of the sulky apparatus invention illustrated in FIG. 11 illustrating the braking system of the sulky apparatus invention.

In order to store the sulky apparatus riding platform 16, the platform 16 is manually rotated as indicated by the arrow labeled R to the position illustrated in FIG. 10 that is directly under the boom assembly 12. This rotation is made possible due to the pin member 28 that is attached to the sulky riding platform 16 that freely rotates within the hole 38 in the elongated pin housing 36. The sulky riding platform 16 is then manually lifted upward as indicated by the arrow U in FIG. 10 to the position illustrated in FIG. 11 where the sulky riding platform 16 is connected to a conventional adjustable strap 244 that is attached to the self-propelled lawn mower 26 at a location between the handles 246 and 248 by a hook 250 that is welded to and extends from the outer interior 252 of the brake drum 86 as illustrated in FIGS. 11 and 12. Alternatively, a conventional chain can be substituted for the strap 244. In manually lifting upward as indicated by the arrow U, the riding platform 16 and the boom 12 is rotated about the pivotal connector 22. This connection secures the sulky riding platform 16 at a location just underneath the handles 246 and 248 of the self-propelled lawn mower 26 where it is out of the way and does not interfere with the operator and the use of the self-propelled lawn mower 26. However, this connection using the hook 250 and the strap 244 does not prevent riding platform 16 from swinging from side to side as illustrated by the arrows labeled SW in FIG. 11.

However, the brake system 100 that is part of the sulky apparatus invention 10 prevents such swinging or back and forth oscillation. In order to use the brake system 100, after the riding platform 16 has been manually connected between the handles 246 and 248, the operator manually pulls the riding platform 16 outward to relieve force from the gas spring 102 that is present between the locking shaft tip 148 and the adjacent hole 146 in the locking bar 134, while simultaneously pulling outward on the ball handle 196 as indicated in FIG. 7. As indicated in FIG. 7, when the ball handle 196 is pulled outward this results in the end portion 148 being pulled out of the hole 146. When this occurs, the outer end portion 144 of the body 134 of the linkage member 132 is no longer secured in the slot 152 in the locking block 192. As a result, the upper portion 164 of the pivot assembly 14 is no longer connected to the linkage member 132 as illustrated in FIG. 4 and the pivot assembly 14 is free to rotate about the pivot fastener 62 illustrated in FIGS. 1, 2 and 12.

As illustrated in FIG. 12, the outer end 110 of the pneumatic power cylinder 102 is connected to the top outer portion of the pin housing 36 of the pivot assembly 14 and the outer end 110 of the pneumatic power cylinder 102 pushes against the top outer portion of the pin housing 36 and causes the pin housing 36 and the connected brake drum 86 to rotate as indicated by the arrow labeled B about the pivot fastener 62 so that the brake drum 86 presses against the adjacent brake pad 84. As a result of the brake drum 86 being pressed against the adjacent brake pad 84, the pivot assembly 14 and the attached sulky riding platform 16 is no longer free to move such as to swing or oscillate on the strap 244 since the brake pad 84 is attached through the upper portion 214 of the brake clamping member 213 to the lower outer under portion of boom assembly 12 by the connecting block 216. When the operator wants to release the brake system 100, the operator merely manually pulls outward on a low portion of the riding platform 16 causing the compression of the previously described pneumatic power cylinder 102. Additionally, the resulting outward movement of the riding platform 16 results in the spring force S exerted by the coil spring 186 pushing the end portion 148 into the hole 146 in the outer end portion 144 of the body 134 to secure the linkage member 132 in the slot 152 in the locking block 192 in the previously described manner associated with FIG. 6. The operator then manually releases the hook 250 from the strap 244 and lowers the sulky riding platform 16 to the ground and manually rotates the sulky riding platform 16 approximately 180 degrees. Then the operator steps aboard the sulky riding platform 16 and allows the self-propelled lawn mower 26 to tow the operator.

It should be clearly understood that the only time that the end portion 148 is not in the hole 146 is when the ball handle 196 has been pulled outward to activate the brake system 100. Also, when the operator pulls outward on the underneath portion of the riding platform 16 to disengage the brake system 100 this results in the rotation of the pivot housing 36 about the pivot fastener 62 and this causes the linkage member 132 to slide in the slot 152 in the locking block 192 until the outer end portion 148 enters the hole 146 in the linkage member 132 due to the spring 186 exerting the spring force S on the outer end portion 148 as illustrated in FIG. 6.

The details of how the pin member 28 is connected to the tubular frame member 32 are also illustrated in FIG. 12. As illustrated, the flange member 33 that is located around the lower portion 30 of the pin member 28 is welded in place underneath or to the left as the flange member 33 is oriented in FIG. 12 to the lower portion 30. The lower portion 30 is in turn welded to an oval shaped end cap 254 that is in turn welded to the adjacent end of the tubular frame member 32 that, as indicated previously, is connected to the forward end portion 15 sulky riding platform 16. In view of this construction, when the pin member 28 is adjusted in the previously described manner to make its long axis perpendicular to the adjacent ground plane G, this also results in connected sulky riding platform being made parallel to the adjacent ground plane G.

The sulky apparatus 10 is constructed of conventional materials known in the sulky apparatus construction art. The manufacturing techniques used in manufacturing the sulky apparatus 10 including those used in cutting, drilling, milling, and welding are all common and well known in the sulky manufacturing art. The brake pad 84 is made from neoprene rubber available from Columbia Rubber Company of Beltsville, Md. and is machined by a water jet machine.

Although the invention has been described in considerable detail with reference to certain preferred embodiments, it will be understood that variations or modifications may be made within the spirit and scope of the invention as defined in the appended claims.

What is claimed is:

1. Sulky apparatus for use behind a self-propelled operator controlled machine having control handles comprising an operator riding platform with a wheel rim and tire connected to the operator riding platform for allowing the operator riding platform to move along the ground, a sulky boom assembly having an inner end and an outer end, pivotal connecting means connected to the outer end of the boom assembly for connecting the operator riding platform to the outer end of the boom assembly, storage means for storing the operator riding platform below the control handles of the self-propelled operator controlled machine and wherein the storage means for storing the operator riding platform below the control handles of the self-propelled operator controlled machine includes braking means having a portion thereof connected to the pivotal connecting means for preventing swinging of the stored operator riding platform when the operator riding platform is in the stored position.

2. The sulky apparatus for use behind a self-propelled operator controlled machine having control handles of claim 1 wherein the braking means includes a brake drum.

3. The sulky apparatus for use behind a self-propelled operator controlled machine having control handles of claim 2 wherein the braking means includes a brake pad located in position to contact the brake drum when the operator riding platform is in the stored position.

4. The sulky apparatus for use behind a self-propelled operator controlled machine having control handles of claim 3 further comprising means for supplying power to push the brake drum against the brake pad.

5. The sulky apparatus for use behind a self-propelled operator controlled machine having control handles of claim 4 wherein the means for supplying power to the brake drum comprises a pneumatic power cylinder.

6. The sulky apparatus for use behind a self-propelled operator controlled machine having control handles of claim 5 further comprising means for activating the braking means.

7. The sulky apparatus for use behind a self-propelled operator controlled machine having control handles of claim 6 wherein the means for activating the braking means comprises a manually activated handle and shaft.

8. Sulky apparatus for use behind a self-propelled operator controlled machine comprising a sulky riding platform with a wheel rim and tire for allowing the operator riding platform to move along the ground, a sulky boom assembly having an inner end and an outer end for connecting the sulky riding platform to the self-propelled machine that is to tow the sulky riding platform, pivotal connecting means for pivotally connecting the sulky riding platform to the outer end of the sulky boom assembly and adjusting means for adjusting the pivotal connecting means with respect to the adjacent ground when the sulky riding platform and the pivotal connecting means are in use wherein the pivotal connecting means includes a circular cross section cylindrical straight pin member and a pin housing pivotally connected to the outer end of the sulky boom assembly with an elongated circular cross section hole extending lengthwise through the pin housing with the hole being sized and shaped to rotatably receive the cylindrical straight pin member wherein the adjusting means is connected to the pin housing and comprises an adjustable length assembly connected to the sulky boom assembly in addition to the pin housing comprising a turnbuckle assembly.

\* \* \* \* \*